United States Patent [19]
Rudel

[11] 3,800,038
[45] Mar. 26, 1974

[54] UTERINE ADMINISTRATON OF EUTECTIC SOLID SOLUTIONS OF STEROID HORMONES IN A STEROIDAL LIPID CARRIER

[75] Inventor: Harry W. Rudel, New York, N.Y.

[73] Assignee: Biological Concepts, Inc., New York, N.Y.

[22] Filed: Apr. 21, 1972

[21] Appl. No.: 246,171

Related U.S. Application Data

[63] Continuation-in-part of Ser. No. 138,317, April 28, 1971, abandoned.

[52] U.S. Cl.............. 424/239, 424/242, 128/13 D, 128/264, 128/271
[51] Int. Cl........................................... A61k 17/00
[58] Field of Search................... 424/236, 238, 239

[56] References Cited
OTHER PUBLICATIONS

Snart, R. S. Nature 215:957–958 Aug. 26, 1967 "Liquid Crystalline Behaviour in Mixtures of Cholesterol With Steroid Hormones"

Fuenzalida, F., J. Clin. Endocrinology 10:1511–1516 (1950) "Absorption of Steroids From Subcutaneously Implanted Tablets of the Pure Hormone and of the Hormone Mixed with Cholesterol"

Kincl et al., Acta Endocrinologica 64:253–264 June 1970 "Sustained Release Hormonal Preparations–Diffusion of Various Steroids From Cholesterol Pellets"

Primary Examiner—Shep K. Rose

[57] ABSTRACT

A pharmaceutical preparation suitable for parenteral administration comprises an active therapeutic ingredient in solid solution with a steroidal lipid carrier. The therapeutic ingredient may be for example, a natural or synthetic steroid hormone, a prostaglandin, or an antibiotic.

6 Claims, No Drawings

UTERINE ADMINISTRATON OF EUTECTIC SOLID SOLUTIONS OF STEROID HORMONES IN A STEROIDAL LIPID CARRIER

CROSS-REFERENCE TO RELATED APPLICATION

This application is a continuation-in-part of application Ser. No. 138,317 filed Apr. 28, 1971, now abandoned.

BACKGROUND OF THE INVENTION

The present invention relates to a novel pharmaceutical preparation adapted for parenteral administration and providing reproducible long-term release of the therapeutically active agent therein when the preparation is injected or implanted in the body.

There have been numerous attempts in the prior art to prepare long acting preparations of therapeutic agents such as steroid hormones. An increased duration of activity has, for example, been achieved by chemical modification of the parent molecule. Thus, various steroid derivatives such as esters, ethers, or enol ethers injected intramuscularly, preferably in oil solutions, will form a depot providing biological effects lasting several weeks. Nevertheless, the disadvantage of oil solutions of such steroid derivatives is the relatively short activity that can be obtained.

Longer lasting effects have been obtained in the prior art by injecting aqueous microcrystalline suspensions of steroid hormones. However, such microcrystalline solutions, although providing a longer lasting effect, are often not well tolerated. In addition, it is difficult to provide a constant dose by using either oil or microcrystalline depot preparations. Finally, to achieve a long lasting effect, it is usually necessary to inject large amounts of the preparations. This results in an initial exposure of the treated subject to very high amounts of active agent, which may result in undesirable side effects.

It has been attempted in the prior art to circumvent these undesirable effects of oil solutions or microcrystalline suspensions by using depot implants of pure steroids. For example, implants of synthetic progestational agents have been used in animal husbandry for estrus synchronization, as described by Reed in U.S. Pat. No. 3,499,445. Further, estradiol, testosterone, progesterone, and desoxycorticosterone compressed into pellets and implanted have been used to treat various endocrine disorders. The biological effect that can be obtained after a single implantation may last several months.

It has been known to combine cholesterol with steroid hormones to provide a long acting implant. Thus, stilbestrol, desoxy-corticosterone acetate, testosterone propionate, progesterone, estrone, or estradiol benzoate have been mixed with cholesterol at various arbitrarily selected specific concentrations and the absorption of these mixtures compared with that of the pure steroid. It was observed that the cholesterol-hormone pellets were absorbed more slowly and uniformly than pellets of pure hormone. Kochakian, Amer. J. Physiol. 145, 549 (1945), used testosterone, testosterone propionate, and 17α-methyl testosterone mixed with cholesterol in certain arbitrarily selected proportions (1:4, 1:2, 1:1, and 2:1) and measured the weight of seminal vesicles in castrated mice 30 days after implantation and notes that pellets with a higher proportion of steroid provided increased androgenic response. Lipschutz and Iglesias, Nature (Lond.) 190, 174 (1961), obtained an antifertility effect in mice with pellets containing 20 percent by weight of 19-norprogesterone and 80 percent cholesterol that lasted the life span of the animals. Folchi Pi et al., Acta endocr. (Kbh.) 48, 602 (1965) were able to inhibit fertility in mice by lipid pellets containing only 10 percent of 19-norprogesterone.

Kincl et al., Acta Endocrinologica 64, 253 (1970), have studied the dissolution of binary mixtures of steroids with various lipids. The pellets were made by mixing the steroids and lipids in desired proportion, melting the mixture, and drawing the molten mass into a glass capillary lubricated with mineral oil. The solidified rods were then pushed out and cut into short cylinders. Dissolution in vitro for various compositions was established by incubating the pellets in distilled water, saline, or reconstituted plasma. The dissolution of steroids from the pellets was influenced by the concentration of the steroid in the compositions. For example, increasing the amount of a steroid in mixtures with cholesterol increases dissolution. In addition, the dissolution of the steroid was influenced by the nature of the lipid phase used and by the surface area of the pellet.

The authors found, however, that reproducibility from batch to batch of pellets was poor. The variation of steroid amounts released between individual pellets was often as much as 20 percent.

GENERAL DESCRIPTION OF THE INVENTION

In accordance with a first aspect of the present invention, it has been found that the activity of certain medicaments, when administered parenterally, such as the steroid hormones, the prostaglandins, and the antibiotics, can be markedly prolonged by by forming a lipophilic solid solution of the medicament with a steroidal lipid. In accordance with a second aspect of the invention, it has been found that the activity of either natural or synthetic steroid hormones when administered parenterally, can be controlled or modified by forming a lipophilic solid solution of the steroid hormone with a steroidal lipid.

A major advantage of the preparation of the present invention is its ability to decrease or attentuate the amount of the medicament dosage considerably, while at the same time a therapeutic response of the desired magnitude is produced and sustained in the patient. This makes it possible to reduce the consumption of what are, for most part, expensive medications, with accompanying benefits to the patient or hospital both in monetary terms and in the general well-being of the person being treated. It also makes it possible for the physician to reduce the use of those synthetic hormones which may expose the patient to undesirable or toxic side-effects when employed for long periods of time.

The steroidal lipids which are employed to form lipophilic solid solutions with the therapeutic agents, in accordance with the invention, and to impart or improve the activity thereof, are characterized by being solid at room temperature, i.e., they do not melt below about 15°C. These lipids are cyclopentanoperhydrophenanthrene type compounds of vegetable or animal origin.

Examples of such steroidal lipids are (1) bile acids, such as, for example, cholic, cholanic, or desoxycholic acid, or their ethyl esters, or cholic acid methyl ester-3,7-diacetate; (2) sterols, such as cholesterol, β-sitosterol, zymasterol, stigmasterol, cholestanol, 7-dehydrocholestenol, coprostanol, 7-dehydrocoprostenol, epicoprostenol, demosterol, campestrol, ergosterol, fucosterol, and 24-hydroxycholesterol, and the esters of these sterols derived from organic carboxylic acids containing from 1 to 12 carbon atoms. Typical sterol esters which may be employed, in accordance with the invention, include the acetate, propionate, butyrate, hemisuccinate, enanthate, caproate, benzoate, trimethylacetate, phenoxyacetate, phenylpropionate, and β-choloropropionate.

In accordance with the invention, one or more of the aforementioned steroidal lipids are admixed with the medicament in proportions such as to form a solid solution. Solid solutions or isomorphous mixtures occur if two components are miscible with each other. Two components may or may not form an unbroken series of solid solutions. To determine the proportions at which two components form an isomorphous substance, the methods of thermal analysis can be employed, e.g. by determination of the freezing or melting temperatures as described, for example, in "The Phase Rule and Its Applications," by A. Findlay, published by Longmans, Green and Co., New York (1927).

When a medicament and a steroidal lipid form an unbroken series of solid solutions the proportion of either component is selected in such manner as to provide the desired strength in the final composition. When the two components do not form an unbroken series of solid solutions, the proportion of either component will depend upon the region of stable equilibrium. A region of stable equilibrium is usually associated with a melting point or range minimum which is below that of the individual components or of any other mixture of the same components. This corresponds to a eutectic region. It will be recognized that in this region both components crystallize in constant proportion. It will be apparent to those skilled in the art that it is possible to select other mixtures close to the eutectic region. In such case, there is simply present an excess of one or the other component. Thus, the solid solutions of the invention may include binary steroid hormone mixtures, or ternary, or other multiphase mixtures, including two or more lipids or therapeutic steroids. For some lipids, or mixtures of lipids, the proportions of the components showing the lowest melting point range may vary rather widely, but the melting point range itself is, in general, comparatively well defined.

The therapeutic steroid hormones or other steroids which are capable of forming solid solution mixtures with steroidal lipids, in accordance with the invention, may include a wide range of such compounds which exhibit the desired specific therapeutic action. The steroids will usually be members of the estrane, androstane, or pregnane series, but the invention is not limited thereto.

The steroid hormones may be of natural or synthetic origin. Thus, for example, natural steroid hormones within contemplation of the invention include progesterone, testosterone and estradiol, but the invention is not limited thereto. Synthetic steroid hormones may also be employed, such as, for example, 19-nor-progesterone, norethindrone, norenthindrone acetate, norethynodrel, ethynodiol diacetate, norgestrel, chlormadinone acetate, megestrol acetate, or lynestrol, and the like. Synthetic estrogenic steroid hormones may be, for example, ethynyl estradiol or mestranol. In other areas, such as steroid anti-inflammatory agents, there may be employed a steroid hormone of natural origin, such as cortisol (hydrocortisone), or a synthetic steroid hormone having antiinflammatory properties, such as prednisolone, paramethasone, or dexamethasone.

Where the solid solution preparation of the invention is to be used for contraceptive purposes, the steroid hormones may be progestational or estrogenic compounds, or a combination of both.

Other types of medicaments which may be utilized in accordance with the invention include prostaglandins, such as prostaglandin $E_1$ and prostaglandin $F_2\alpha$, which are useful for inducing uterine contractions, and which are usually administered intravenously.

An antimicrobial agent such as antibiotic, for example, a tetracycline or a penicillin, may also be employed.

The preparation of the solid solution of the steroidal lipid and the medicament will vary with both the choice of the drug and the lipid, but is readily determined in a given system by carefully mixing and/or melting the components together and then disintegrating the resulting mass, for example, by dispersion, milling, or the like. The melting points of the compositions containing varying proportions of the components are then measured. The mixture having the lowest melting point or range has the desired proportions according to the invention. The mixture showing the lowest melting range is preferred, but mixtures melting 10° to 15°C above the lowest melting temperature may also be employed in some cases. The intimate mixture can also be produced by dissolving the substances in an inert common solvent such as chloroform, ethanol, methylene dichloride, and the like, and evaporating the solvents.

The lipophilic solid solutions of medicaments with one or more steroidal lipids, contemplated by the present invention, are those in which the proportion of ingredients is selected so as to produce the lowest melting temperature or range in the mixture. This melting temperature or range will also usually be lower than the melting temperatures of any of the ingredients, where these ingredients exhibit individual melting temperatures. The lowest melting solution provides not only a constant release for parenterally administered drugs, but also for drugs placed within body or organ cavities, such as the uterine cavity, in the form of pellets, which may be introduced for example via an intrauterine medicator as described in Example 5 below.

As demonstrated by the data in the accompanying examples, the lowest melting temperature solid solutions of the invention provide preparations for parenteral administration which are superior to non-low melting similar preparations in respect to uniformity of release of the medicament, and uniformity of dissolution or absorption of the active ingredient into the system of the patient.

In U.S. Pat. No. 3,284,303 there is described the preparation of a mixture of 1 part of progesterone with 9 parts of commercial glyceryl monostearate, for oral administration, which is characterized in the patent as a solid solution, but no indication is given of the melting temperature of the mixture. A test of the melt-point range of ths mixture indicates that it is 105°–125°C., which is consistently higher than the melting range of any other mixtures of progesterone and glyceryl monostearate. Moreover the melting range of other mixtures, from 10:90 to 80:20 weight ratio of progesterone to glyceryl monostearate, is of the order of 52°–96° to 69°–123°, with no lowest melting point range being clearly manifested.

The lowest melting solid solutions of the invention may be given various forms suitable for parenteral administration by insertion, implantation, or subcutaneous injection, in fatty tissue, or in a muscle to provide a preparation having prolonged action. Preferably the preparation is formed into spheres of sufficiently small diameter to permit injection via a hypodermic needle, e.g., less than about 0.4mm.

The proportions of medicament to steroidal lipid will differ according to the components of the mixture. For example, a mixture of about 45 parts by weight of progesterone, m. 127°–131°C, and about 55 parts by weight of cholesterol, m. 148.5°C., forms a lowest melting range of about 107°–108°C, which is below each individual melting temperature. When cholesterol acetate, m. 115°–116°C. is substituted for cholesterol, a lowest melting mixture is formed with about 38 parts by weight of progesterone and about 62 parts by weight of cholesterol acetate, the mixture melting 95.5°–97°C. When β-sitosterol m. 140°C is used, a lowest melting mixture is formed from about 49 parts by weight thereof with about 51 parts by weight of progesterone, the mixture melting at 92°C.

Table I below shows the melting point and weight percentage composition of a number of suitable steroid-lipid compositions according to the present invention:

TABLE I
STEROID-LIPID INJECTABLE COMPOSITIONS

| STEROID HORMONE | LIPID | LOW MELTING LIPID RANGE (% by weight) | UNCORRECTED M.P.T. RANGE, °C. |
|---|---|---|---|
| Progesterone | Cholesterol | 40–60 | 107–108 |
| | β-sitosterol | 25–60 | 90–100 |
| | Dihydrocholesterol | 30–75 | 105–115 |
| | Cholesterol Acetate | 25–75 | 95–97 |
| Estradiol | Stigmasterol | 15–75 | 165–170 |
| | Dihydrocholesterol | 25–65 | 145–160 |
| Testosterone | Cholesterol Acetate | 10–30 | 135–150 |
| | 5α-Dihydrocholesterol | 70–80 | 105–110 |
| Megestrol Acetate | Cholesterol | 75 | 140–165 |
| | β-sitosterol | 80 | 130–150 |
| | Stigmasterol | 75–90 | 150–170 |
| | Cholesterol Acetate | 20–30 | 180–210 |

Some solid solutions may form a multiple low melting combination, for example a diphasic combination: that is, a low melting mixture will be formed at two or more different concentrations. For any given steroid hormone, it is of advantage to select the lipid phase to provide a multiple low melting solid solution, if possible, since this permits a choice in the concentration of the steroid administered. In systems exhibiting multiple low melting points, the present invention comprehends the use of any of such compositions formed, and not only the lowest melting. Each solid solution shows the desired reproducible release of active agent, but some may contain a more desirable content of therapeutic agent than others.

For implantation, the solid solutions are conveniently formed into pellets, the size of which will depend on the dosage level at which the active agent is to be administered and the concentration of the agent in the particular eutectic mixture employed. For injection, the mixtures are suitably formed in known fashion into micropellets. Again, the number of pellets administered will vary from case to case depending on the desired dosage rate and the release characteristics of the specific low melting composition. The rate of dissolution of active agent from pellets or micropellets of a specific low melting mixture can be readily determined by in vitro or in vivo tests of the kind hereinafter described.

The dosage rates for drugs implanted in an organism under treatment are from one-fifth to one-tenth the doses commonly used when the drug is administered by other parenteral routes, e.g., by subcutaneous or intramuscular injection, because of the greater efficiency of the implant route. Progesterone, for example, is administered intramuscularly in oil solution or aqueous suspension in amounts of 25–50 mg per day. Testosterone propionate is generally administered intramuscularly in oil solution in amounts of about 25 mg every other day. Estradiol, as a further example, is now administered subcutaneously or intramuscularly as an aqueous suspension in amounts of 0.25–0.5 mg per day.

As compared with the dosage rates for drugs now administered orally, implantation of the same drugs permits the use of doses only 1/50th or 1/100th as large.

DESCRIPTION OF THE PREFERRED EMBODIMENTS

The following examples serve to illustrate the practice of the present invention, but are not to be regarded as limiting:

EXAMPLE I

Progesterone (4-pregnene-3,20-dione) labelled with carbon 14 was mixed with an amount of non-radioactive progesterone such that the final radioactivity of the sample, determined by counting in a liquid spectrophotometer scintillation counter, was 160 decompositions per minute (dpm) per microgram. 45 parts of this material was mixed with about 55 parts of cholesterol to form a low melting mixture A(m. 107°–108°C). Another, non-low melting, mixture B was made consisting of 20 parts of progesterone and 80 parts of cholesterol. Both mixtures were carefully heated in a small hand press and when almost molten extruded through openings about 2mm in diameter. The resulting solid rods were cut into 3mm long sections, and rotated rapidly in an apparatus with an abrasive surface ("merumerizing"). The resulting spherical particles were graded by sieving. Particles passing through a 10 mesh sieve, but retained on a 20 mesh sieve, were used.

To three of six Erlenmeyer flasks, each containing 100 ml of distilled water, were added 5 pellets of the low melting mixture A, and to the other flasks 5 pellets of mixture B. At regular intervals, aliquots of the incubating medium were withdrawn and the amount of radioactivity present was determined as a measure of the amount of steroid found in the incubating medium. The incubating medium was changed every 24 hours.

As summarized in tabular form below, it was found that pellets made from the low melting mixture A gave reproducibly steady dissolution, whereas pellets made from mixture B gave erratic results.

Dissolution of Progesterone from Pellets of Low Melting and Non-Low Melting Mixtures with Cholesterol

| Day | Dissolution g/24 hrs/pellet | | | | | |
|---|---|---|---|---|---|---|
| | LOW-MELTING MIXTURE A | | | MIXTURE B | | |
| | 1 | 2 | 3 | 1 | 2 | 3 |
| 1 | 12.9 | 11.8 | 13.2 | 6.7 | 2.9 | 7.0 |
| 2 | 13.3 | 12.4 | 12.2 | 5.1 | 6.9 | 3.6 |
| 3 | 12.5 | 13.0 | 12.9 | 3.1 | 5.0 | 2.9 |
| 4 | 12.7 | 12.5 | 12.0 | 4.5 | 2.8 | 5.4 |

EXAMPLE 2

A low melting mixture containing about 45 parts of progesterone and about 55 parts of cholesterol (m. 107°–108°C) was formed using the technique of Example 1. The dissolution of progesterone from such pellets was compared with dissolution from a non-lowest melting mixture of 6 parts of progesterone and 94 parts of cholesterol by incubating in distilled water. Again, it was found that the release of progesterone was much more uniform from the low-melting solid solution than from the other mixture.

EXAMPLE 3

The dissolution of progesterone was compared from two preparations — one a low melting solid solution and the other non-low melting mixture — as described in Example 2, except that β-sitosterol was substituted for cholesterol. Again, dissolution of progesterone from the low melting mixture was uniform whereas dissolution from the other mixture was erratic.

EXAMPLE 4

A low melting solid solution mixture of progesterone and cholesterol was prepared as in Example 2 using sufficient quantities of $C^{14}$ — progesterone as a radioactive tracer to give a composition showing 56 disintegrations per minute, per g of progesterone.

The mixture was formed into micropellets on a rapidly rotating abrasive disc (Merumerizer) and then graded by sieving. Particles passing through a No. 10 sieve (U.S. Standard Sieve Series) but retained on a No. 12 Sieve were used.

Ten particles of the composition were implanted subcutaneously in a female rat weighing about 150 g (Animal 1). Twenty of the particles were implanted in a second test rat of about equal weight. The animals were placed in a metabolic cage and their urine and feces were collected.

The radioactivity in a combined sample of the excreta of each animal was measured after 4 and 7 days, as follows:

| Animal | Excretion (dpm) | |
|---|---|---|
| | Day 4 | Day 7 |
| 1 | 16400 | 12000 |
| 2 | 33100 | 23400 |

Thus, about twice as much progesterone (measured by the residual radioactivity) was released in Animal 2 as in Animal 1 as a result of doubling the pellet dose administered.

EXAMPLE 5

Five grams of a low melting mixture containing 45 parts progesterone and 55 parts cholesterol were dissolved in 75 ml. of methylene dichloride. Fifty mg. of magnesium stearate and 25 mg. of polyvinylpyrrolidone was added to the solution. The solution was evaporated to dryness and the resulting dry mixture was pulverized. The resultant material was tableted in a conventional way into cylindrical tablets 2.5 mm in diameter and 2.0 mm in height. Ten such tablets were used to fill an intrauterine medicator as described in U.S. Pat. application Ser. No. 3137 filed Jan. 15, 1970 now U.S. Pat. No. 3,656,483, issued Apr. 18, 1972. The intrauterine medicator with said tablets of progesterone was then used to suppress the uterine endometrium to prevent excessive menstrual bleeding.

I claim:

1. The method for the administration of steroid hormone therapy to a human or animal female which comprises introducing into the uterine cavity in solid unit dosage form a therapeutically effective amount of a preparation comprising a lipophilic solid solution of a therapeutically active steroid hormone in a steroidal lipid carrier, the proportions of said steroid hormone and said steroidal lipid carrier being selected to impart to the preparation of a lower melting temperature than that of the individual steroidal components.

2. The method of claim 1 in which the steroidal lipid is selected from the group consisting of a sterol and a sterol ester.

3. The method of claim 2 in which the sterol is cholesterol.

4. The method of claim 1 in which the steroid is a progestational steroid.

5. The method of claim 4 in which the progestational steroid is progesterone.

6. The method of claim 1 in which said dosage unit is a tablet or pellet.

* * * * *